United States Patent
Guth et al.

[11] Patent Number: 5,953,911
[45] Date of Patent: Sep. 21, 1999

[54] REGENERATION OF CATALYST/ABSORBER

[75] Inventors: Eugene D. Guth, Escondido, Calif.; Larry E. Campbell; Gregory J. Wagner, both of Knoxville, Tenn.

[73] Assignee: Goal Line Environmental Technologies LLC, Los Angeles, Calif.

[21] Appl. No.: 09/018,720

[22] Filed: Feb. 4, 1998

[51] Int. Cl.⁶ ............................................. F01N 3/00
[52] U.S. Cl. .......................... 60/295; 60/297; 60/274; 502/34
[58] Field of Search .................... 60/297, 295, 274, 60/301; 502/34

[56] References Cited

U.S. PATENT DOCUMENTS

| | | |
|---|---|---|
| 3,230,179 | 1/1966 | Schwazzenbek . |
| 3,856,485 | 12/1974 | Mansell . |
| 3,953,575 | 4/1976 | Gidaspow et al. . |
| 4,323,544 | 4/1982 | Magder . |
| 4,533,365 | 8/1985 | Ringel . |
| 4,789,531 | 12/1988 | Eichholtz et al. . |
| 5,538,697 | 7/1996 | Abe et al. .......................... 422/171 |
| 5,599,758 | 2/1997 | Guth et al. ............................ 502/34 |
| 5,607,650 | 3/1997 | Debbage et al. .................... 422/178 |
| 5,715,677 | 2/1998 | Wallman et al. ..................... 60/274 |

*Primary Examiner*—F. Daniel Lopez
*Assistant Examiner*—Binh Tran
*Attorney, Agent, or Firm*—Kenneth H. Johnson

[57] ABSTRACT

Hydrocarbon in a carrier of nitrogen or steam is passed over a devitalized supported noble metal/alkali or alkaline earth catalyst/absorber, such as Pt on an alumina monolith coated with potassium carbonate, which has sorbed NOx from engine exhaust to restore and regenerate the devitalized catalyst/absorber for reuse. The hydrocarbon undergoes a shift reaction to produce CO in situ which is the reactant gas for the regeneration.

16 Claims, 3 Drawing Sheets

REGENERATION OF CATALYST/ABSORBER

BACKGROUND OF THE INVENTION

1. Field of the Invention

This invention is directed to a process for the regeneration of the devitalized catalyst/absorber after extended exposure to pollutants in the combustion gases of engines.

2. Related Information

Turbine power plants are becoming the standard for generating electricity because they are so efficient compared to any other form of power manufacture. Turbine power plants that burn methane to produce power for residents and manufacturing facilities in cities also produce carbon monoxide and nitrogen oxide as pollutants. It is highly desirable to reduce or eliminate these pollutants so that the air is not contaminated as a result of power production.

Over the years, as the technology improved, the level of permitted pollution has been decreased. Initially, the permitted level of pollution by power plants for nitrogen oxides (NOx), which includes nitric oxide (NO) and nitrogen dioxide ($NO_2$), was less than 100 parts-per-million (ppm) and the level of carbon monoxide (CO) was less than 100 ppm. Later, the requirements were made more stringent and it was necessary to reduce the NOx to less than 25 ppm and the CO today is still permitted at any amount less than 100 ppm. Using current technology, the output levels of NOx can be reduced to the range of 5 to 9 ppm plus slippage resulting from the selective catalytic reduction (SCR) technology described below.

The only prior technology which is currently available to obtain the 5 to 9 ppm NOx levels is called selective catalytic reduction in which ammonia is mixed with the flue gas and then passed over a catalyst which selectively combines the nitrogen oxides and ammonia to eliminate a major portion of the NOx. One problem with the selective catalytic reduction is that, as a practical matter, it is only capable of reducing the Nox to the range of 5 to 9 ppm. Another problem, referred to as slippage, is that the ammonia injected into the system to react with the NOx slips past the catalyst without conversion and is ejected from the system in its native form, which is hazardous to the environment in its own right.

There have been other technologies for reduction of pollution which have been advanced, such as overwatering in the combustor, and these also have the potential to reduce the NOx pollution, but none of them reduce the NOx to levels much less than 5 to 9 ppm.

In commonly assigned U.S. Pat. No. 5,650,127, which is incorporated herein in its entirety, we described a pollution reduction process and apparatus in which the pollutants from a turbine gas stream including No and CO in the gas stream are first oxidized to corresponding $NO_2$ and $CO_2$, and then the $NO_2$ is absorbed on an absorption bed.

In commonly assigned U.S. Pat. No. 5,451,558, which is incorporated herein in its entirety, a catalyst/absorber is described and consists of a support with an alumina washcoat disposed thereover, a platinum catalyst disposed on the washcoat, and with an alkali or alkaline earth carbonate or bicarbonate coating thereon, the carbonate coating being lithium, sodium, potassium or calcium carbonate. This application also discloses a process for treating exhaust streams in which the stream is contacted with the catalyst/absorber which oxidizes the nitrogen oxides to nitrogen dioxide; oxidizes the carbon monoxides to carbon dioxide; and oxidizes the sulfur dioxide ($SO_2$) to sulfur trioxide ($SO_3$). This oxidation occurs at temperatures in the range of 150° to about 750° F., and more preferably in the range of 175° to 400° F., and most preferably in the range of 200° to 365° F. The space velocity (GHSV) of the exhaust gas may be in the range of 5,000 to 50,000 $hr^{-1}$. The same catalyst/absorber has a second function of absorbing the oxidized pollutants at the same temperatures so that the resultant exhaust gas stream is substantially free of harmful pollutants.

When the catalyst/absorber ceases to be effective, and specifically, when the level of pollutants emanating from the apparatus after contact with the catalyst/absorber increases beyond an acceptable level, the absorber can be replaced, and the used absorber should then be recharged to an effective status again. One method of regenerating the catalyst is to remove the spent (saturated or partially saturated) carbonate from the catalyst/absorber and replace the spent carbonate with fresh unreacted carbonate, for example, dissolving the absorber, generally potassium carbonate or sodium carbonate, from the absorber/catalyst to remove the absorber from the catalyst, and then replacing the absorber on the catalyst with fresh absorber. The nitrates and nitrites are then separated from the unreacted carbonate in the dissolved absorber so the unreacted carbonate can be reused. However this process would most likely require removal of the catalyst/absorber from the exhaust system and create large quantities of liquid waste streams to dispose of.

U.S. Pat. No. 5,599,758 discloses hydrogen and/or carbon monoxide in an inert carrier gas passed over a devitalized catalyst/carbonate or bicarbonate absorber which has absorbed or adsorbed nitrates and nitrites from engine exhaust is to restored to the carbonate form and regenerated for reuse.

SUMMARY OF THE INVENTION

In the present invention, a devitalized catalyst/absorber is regenerated, that is, treated to restore the initial activity or to otherwise substantially improve the activity, by passing a regeneration gas over it. Briefly the present invention is a method for regenerating devitalized absorber used for removing nitrogen oxides from gases and containing an alkali or alkaline earth metal carbonate or bicarbonate component of the absorber comprising: contacting the devitalized absorber with a gaseous stream containing an effectuating amount of hydrocarbon to remove a portion of the nitrogen oxides. In a preferred embodiment the devitalized absorbent is a component of a catalyst/absorbent composition. Suitable reducing agents also include carbon monoxide, hydrogen and mixtures thereof with hydrocarbon. At regeneration conditions the hydrocarbon undergoes a shift reaction to produce carbon monoxide and steam. The hydrocarbon preferably comprises $C_1$–$C_2$ hydrocarbons, which may be used as one compound or mixtures of compounds. Usually the regeneration gas will comprise a mixture of hydrocarbons. The principal source of methane is natural gas. The principal component of the gaseous stream is an inert carrier gas such as nitrogen, helium, argon or steam.

As used herein the term "absorbed" shall also include adsorbed.

DETAILED DESCRIPTION OF THE INVENTION

Figure 1:
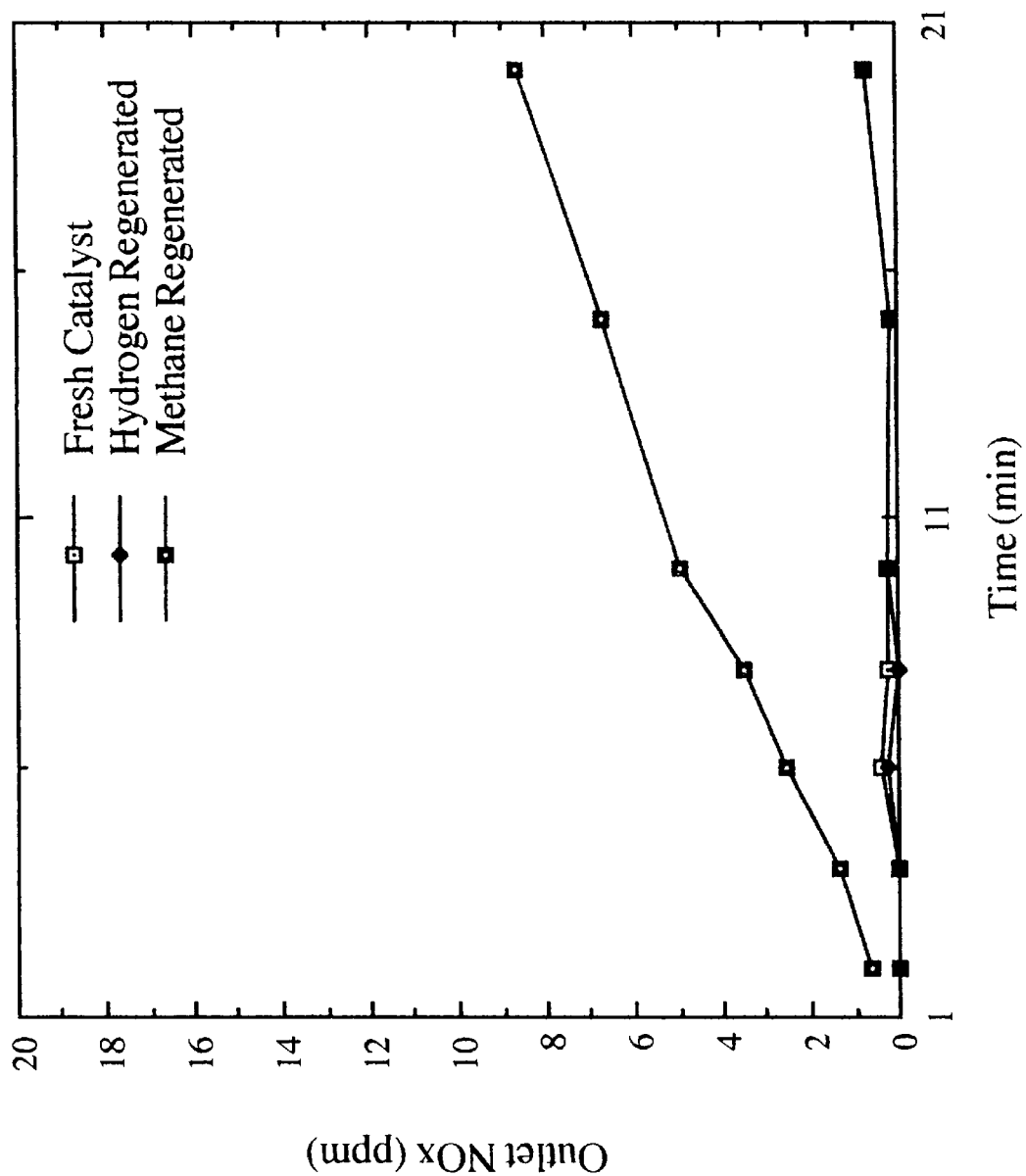
FIG. 1 is a graph comparing regeneration with hydrogen compared to methane.

The regeneration gas comprises a reactant gas or mixture of reactant gases along with a carrier gas or carrier gas mixture. The reactant gases are reactive reducing agents to convert the oxidized forms of the absorber made in the absorption step. The preferred reactants gases are carbon monoxide or hydrogen or combinations of carbon monoxide and hydrogen. It has now been found that hydrocarbons which at regeneration conditions undergo a shift reaction to produce carbon monoxide and steam in the presence of the catalyst/absorber may also be used. The reactant gases make up about 500 ppm to 10 percent of the regeneration gas; the remainder of the regeneration gas is the carrier gas mixture.

The carrier gas may comprise principally nitrogen or steam, for example, a regeneration stream having 50 percent or more nitrogen may have smaller concentrations of hydrocarbon and steam; or a regeneration stream having 50 percent or more steam may have smaller concentrations of nitrogen and hydrocarbon. Nitrogen in high concentrations of about 50% to about 80% provides an excellent carrier for the reductants. Steam is also a good carrier in concentrations of 30% to 98% with the balance being nitrogen.

The regeneration gas is substantially oxygen free, although up to one percent oxygen may be present without significant negative effects.

The devitalized catalyst/absorber has absorbed or adsorbed nitrogen oxides and sulfur oxides in a plurality of chemical forms. The reactant gas reduces the nitrogen oxides to eliminate nitrogen and displaces the sulfur oxide. The apparent stoichiometry is two moles of carbon monoxide and/or hydrogen for each mole of nitrogen oxide on the catalyst/absorber and one mole of reactant gas for each mole of sulfur oxide on the catalyst/absorber. Thus, when hydrocarbon is the source of CO the molar amount of CO produced under the regeneration conditions for hydrocarbon or mixture of hydrocarbons used may be determined and the amount of hydrocarbon in the regeneration stream adjusted accordingly. Preferred hydrocarbons are $C_1$-$C_{12}$ hydrocarbons, for example methane, propane, propylene, cyclohexane, cyclohexene, dodecene, toluene, benzene and the like. The regeneration gas may comprise a single compound or mixture of compounds and may include any one or mixture of alkane, alkene, and aromatics. The alkenes and alkanes may be cyclic or alicyclic and the aromatics may have one or more rings or substituent hydrocarbon groups. The preferred source of methane is natural gas.

The regeneration of the catalyst/absorber by this method can be performed at temperatures preferably in the range of 250° to 750° F. more preferably from about 300° F. and most preferably from about 400° F. and preferably at a pressure of substantially one atmosphere pressure. Hydrocarbons having olefinic unsaturation exhibit lower suitable operating temperatures. For economic reasons the temperature is usually the same temperature at which absorption was carried out, but there is no actual limitation on the temperature provided that it is within the range set forth above.

The gaseous stream may be conducted through the regeneration chamber at a fairly wide range of flow rates. The optimum flow rate will depend upon such variables as the temperature of the reaction, pressure and particle size or channel size in the case of certain supports. The flow rate is measured by the gaseous volumes of the regeneration stream (including the carrier and reactive gases) per volume of chamber containing catalyst/absorber per hour, referred to as the gas hourly space velocity (GHSV). The GHSV for the present regenerations may be in the range of 10 $hr^{-1}$ to 100,000 $hr^{-1}$, preferably at least 100 $hr^{-1}$ and less than 30,000 $hr^{-1}$, more preferably in the range of 500 $hr^{-1}$ to 16,000 $hr^{-1}$. The regeneration time is determined by the stoichiometries, i.e., moles absorbed and the concentration of the reactant gas and the flow rate of the regeneration gas. The regeneration reactions are rapid and completion of regeneration can be determined by monitoring the off gas for reactant gases. Usually the regenerations within the preferred temperature range will require at least about 2 minutes to about 10 minutes. At temperatures substantially within the preferred range regenerations can require up to an hour.

Efficiencies of up to 99.9% for nitrogen oxide reactions to nitrogen and water can occur during the regeneration.

The regeneration system of the present invention works with both non-aqueous and aqueous platinum deposited catalysts.

The oxidation catalyst is selected from the group of noble metal elements, base metal transitional elements and combinations thereof. More particularly, the oxidation catalyst are selected from platinum, palladium, rhodium, cobalt, nickel, iron, copper and molybdenum, and preferably, platinum and rhodium, and most preferably, platinum.

The oxidation catalyst concentration may be 0.05 to 0.6 percent by weight of the material, and preferably is 0.1 of 0.4 percent by weight of the material, and most preferably is 0.15 to 0.3 percent by weight of the material. More than one element may be used as an oxidation catalyst specie, and under these conditions each of said elements has a concentration in the range of 0.05 to 0.6 percent by weight.

The catalyst is preferably combined with a absorber comprising at least one alkali or alkaline earth compound, which can be hydroxide compound, bicarbonate compound, or carbonate compound, or mixtures of hydroxides and/or bicarbonates and/or carbonated compounds. Preferably, the absorber comprises substantially all carbonate, and most preferably sodium carbonate, potassium carbonate or calcium carbonate. The absorber is disposed on the material at a concentration in the range of 0.5 to 20 percent by weight of the material, preferably 5.0 to 15 percent by weight of the material, and most preferably about 10% percent by weight of the material.

The high surface area support is made of alumina, zirconia, titania, silica or a combination of two or more of these oxides, such as a monolith. Preferably, the high surface area support is made of alumina. The surface area of the support is in the range of 50 to 350 square meters per gram, preferably 100 to 325 square meters per gram, and more preferably 200 to 300 square meters per gram. The high surface area support may be coated on a ceramic or metal matrix structure.

The catalyst/absorber is a material for removing gaseous pollutants from combustion exhaust preferably comprising an oxidation catalyst specie or component selected from platinum, palladium, rhodium, cobalt, nickel, iron, copper, molybdenum or combinations thereof disposed on a high surface area support, said catalytic component being intimately and entirely coated with an absorber material selected from a hydroxide, carbonate, bicarbonate or mixture thereof of an alkali or alkaline earth or mixtures thereof. More preferably platinum is supported on alumina with an alkali or alkaline earth carbonate or bicarbonate coating thereon, the carbonate coating being lithium, sodium, potassium or calcium carbonate, with a potassium carbonate being most preferred.

EXAMPLES

The following test results show that the catalyst/absorber can be regenerated with satisfactory performance.

The catalyst/absorber was prepared on 200-cell-per-square-inch cordierite square-cell honeycomb. The washcoat was prepared by dispersing τ alumina in acetic acid solution and ball milling until the particles were less than 2 microns. The ceramic honeycomb was dipped into the slurry of washcoat, removed, blown off, and then dried and calcined at 500° C. The wash-coated honeycomb was then immersed into a chloride and sulfate free solution containing soluble Pt. After blowing off the excess and drying, the sample was again calcined at 500° F. Finally, the sample was immersed in a solution containing 10% $K_2CO_3$, removed, blown off, and then dried at 150° C.

For laboratory testing, the catalyst/absorber block was core drilled using a diamond-embedded core drill. The 0.78 $in^3$ sample was then placed into a 304 stainless steel tubular reactor and placed inside a three-zone furnace. The reactor was connected to a gas delivery system which delivered mixed gases simulating a gas turbine exhaust. The gases were measured and controlled by Matheson mass flow transducers. Water was injected into a preheat furnace using a Cole Parmer instrument number 74900 precision syringe pump. The test gas composition is given in Table 1.

TABLE 1

| Test Gas Compositions | |
|---|---|
| Gas Component | Concentration |
| CO | 10 ppm |
| NO | 30 ppm |
| $O_2$ | 14.52% |
| $CO_2$ | 3.05% |
| $H_2O$ | 10.20% |
| $N_2$ | Balance |

Before entering the analytical instruments, the water was removed with a chiller. The dried exhaust was then analyzed.

All run cycles (Table 1) were conducted for 20 minutes at a temperature of 500° F. and a space velocity of 30,000 $hr^{-1}$ Standard regeneration cycles were conducted with the gas composition given in Table 3 at a space velocity of 2000 $hr^{-1}$. Hydrogen regenerations always preceded hydrocarbon regenerations with intermittent run cycles. This procedure established a control with which regenerations with hydrocarbons could be compared. The hydrocarbons examined in this work are given in Table 4.

TABLE 3

| Regeneration gas composition | |
|---|---|
| Gas Component | Concentration |
| CO | 0.02% |
| $CO_2$ | 1.00% |
| $N_2$ | 57.14% |
| $H_2O$ | 40.84% |
| $H_2$ or Hydrocarbon | 2.00% |

TABLE 4

| Hydrocarbons examined |
|---|
| Methane |
| Propane |
| Propylene |
| Toluene |

Example 1

FIG. 1 illustrates a typical run using a fresh catalyst/absorber having (1) a run following a hydrogen regeneration at 300° F., and (2) a run following a methane regeneration at 300° F. By comparing the NOx removal efficiencies during these runs, the efficiency of the regenerations can be examined. For example, the run following the methane regeneration is less efficient at NOx removal. This result illustrates that the methane regeneration did not remove the Nox sorbed onto the catalyst during the previous run at 300° F. as efficiently as hydrogen.

Example 2

Figure 2:
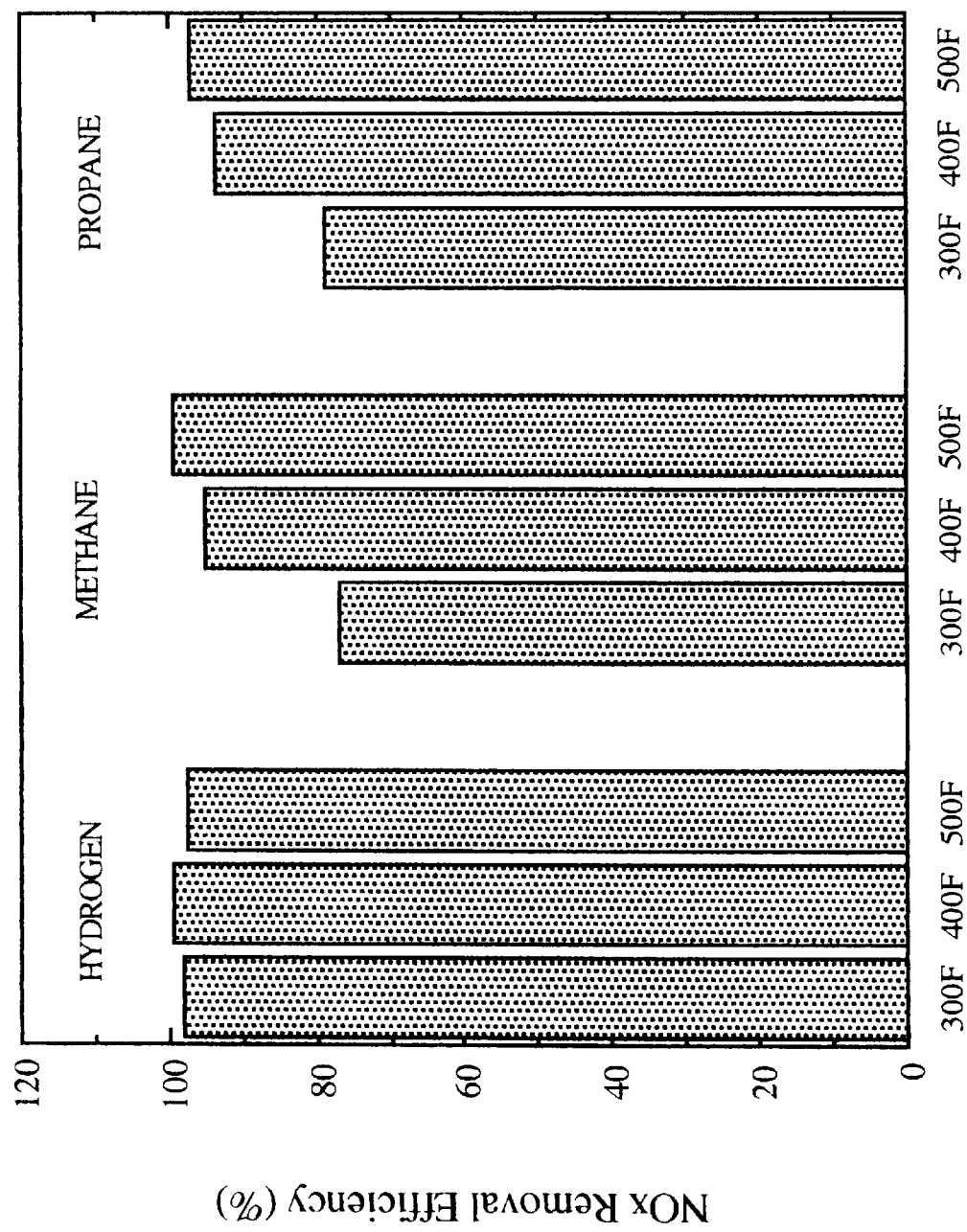
FIG. 2 is a bar chart comparing regeneration with hydrogen to methane and propane at different temperatures.

FIG. 2 illustrates 20-minute NOx removal efficiencies during hydrogen, methane, and propane regenerations at regeneration temperatures of 300, 400, and 500° F. Consistent with FIG. 1, FIG. 2 also demonstrates that methane is less effective at regenerating the catalyst/absorber at 300° F., however, at 400° F., there is an improvement in NOx removal efficiency, and at 500° F., the NOx removal efficiency is very similar to the runs following hydrogen regenerations.

Figure 3:
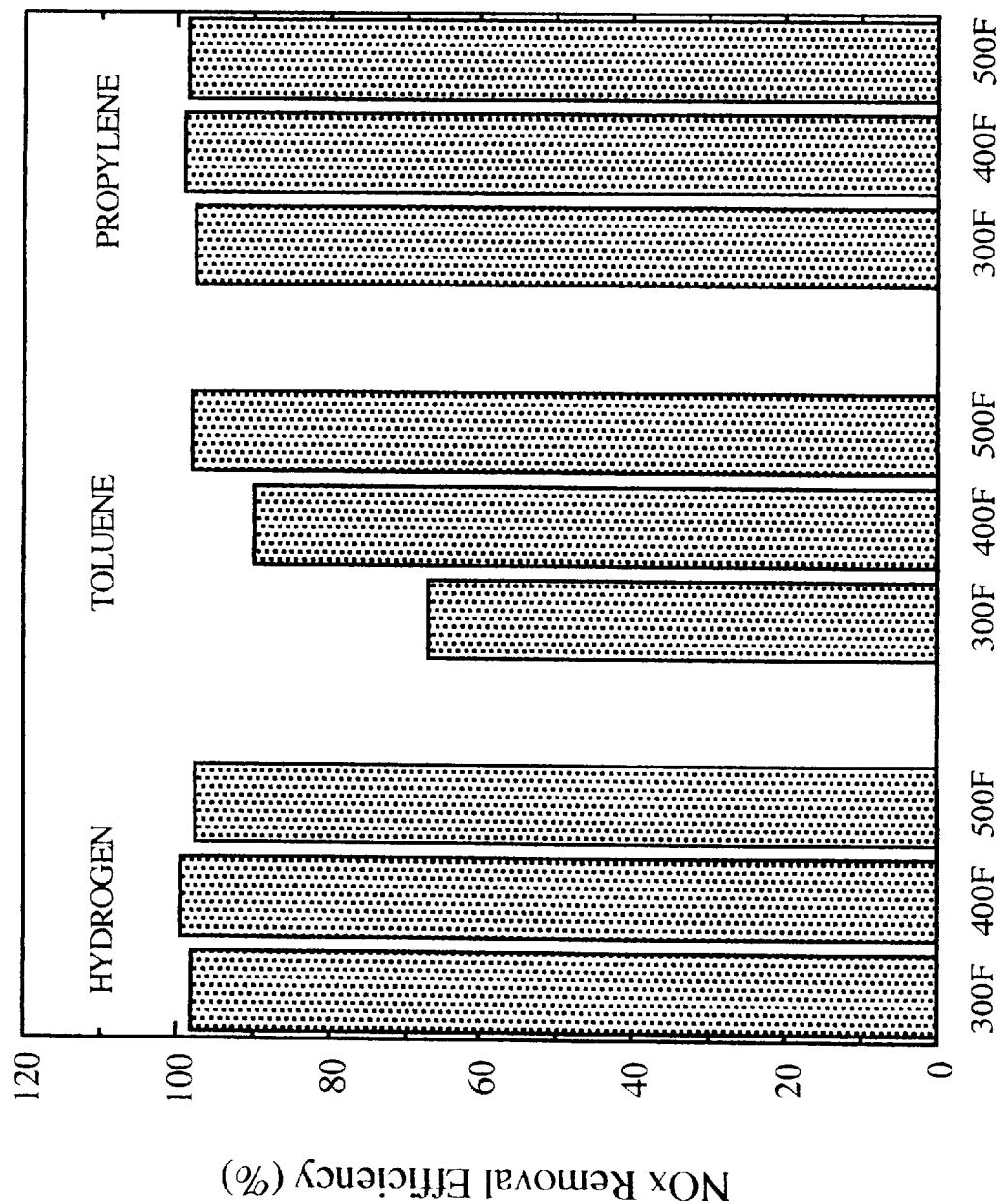
FIG. 3 is a bar chart comparing regeneration with hydrogen to toluene and propylene at different temperatures.

FIG. 2 also demonstrates that propane behaves almost identically to the methane where again full regeneration is indicated only at 500° F. FIG. 3 shows complete regeneration of the catalyst/absorber utilizing toluene is accomplished in the vicinity of 500° F. Below 500° F., incomplete regeneration is indicated; however, FIG. 3 also illustrates that propylene regenerations regenerate the catalyst/absorber at lower temperatures. This result is attributed to the susceptibility of the double bond to chemical attack and suggests that unsaturated hydrocarbons may be acceptable reducing agents at temperatures below 500° F.

The invention claimed is:

1. A method of regenerating a devitalized catalyst/absorber comprising an oxidation catalyst component selected from platinum, palladium, rhodium, cobalt, nickel, iron, copper, molybdenum or combinations thereof disposed on a high surface area support and an absorber material selected from a hydroxide, carbonate, bicarbonate or mixture thereof of an alkali or alkaline earth or mixtures thereof and having nitrogen oxides absorbed therein or thereon, said method comprising the steps of:

providing a stream of regenerating gas comprising hydrocarbon and an inert carrier gas; and passing said stream of regenerating gas over said devitalized catalyst/absorber for an effective time, at an effective temperature and at an effective space velocity to remove said nitrogen oxides from said devitalized absorber to form a regenerated catalyst/absorber.

2. The method according to claim 1 wherein said temperature is in the range of 250° F. to 750° F.

3. The method according to claim 2 wherein said hydrocarbon comprises $C_1$–$C_{12}$ hydrocarbon.

4. The method according to claim 1 wherein said hydrocarbon comprises methane.

5. The method according to claim 4 wherein said methane is contained in a natural gas stream.

6. The method according to claim 1 wherein said hydrocarbon comprises propane.

7. The method according to claim 1 wherein said hydrocarbon comprises propylene.

8. The method according to claim 1 wherein said hydrocarbon comprises toluene.

9. The method according to claim 1 wherein the space velocity is in the range of 10 $hr^{-1}$ to 100,000 $hr^{-1}$.

10. The method according to claim 9 wherein the space velocity is in the range of 500 to 16,000 $hr^{-1}$.

11. The method according to claim 1 wherein said catalyst component is coated with said absorber.

12. The method according to claim 11 wherein the absorber comprises a coating of an alkali or alkaline earth carbonate or bicarbonate thereon.

13. The method according to claim 12 wherein the alkali or alkaline earth carbonate comprises potassium carbonate.

14. The method according to claim 1 wherein the catalyst comprises platinum.

15. The method according to claim 1 wherein the catalyst/absorber comprises an alumina support with a platinum coating thereon.

16. The method according to claim 1 wherein said inert carrier gas comprises nitrogen, helium, nitrogen or steam.

* * * * *